United States Patent
Asai (10) Patent No.: US 10,089,050 B2
(45) Date of Patent: Oct. 2, 2018

(54) INFORMATION PROCESSING DEVICE, AND METHOD AND COMPUTER-READABLE MEDIUM THEREFOR

(71) Applicant: BROTHER KOGYO KABUSHIKI KAISHA, Nagoya, Aichi (JP)

(72) Inventor: Norihiko Asai, Tajimi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 525 days.

(21) Appl. No.: 14/502,219

(22) Filed: Sep. 30, 2014

(65) Prior Publication Data

US 2015/0146245 A1    May 28, 2015

(30) Foreign Application Priority Data

Nov. 26, 2013  (JP) .................................. 2013-244283

(51) Int. Cl.
*G06F 17/30* (2006.01)
*G06F 3/12* (2006.01)
(Continued)

(52) U.S. Cl.
CPC .......... *G06F 3/1288* (2013.01); *G06F 3/1208* (2013.01); *G06F 3/1245* (2013.01); *G06F 3/1287* (2013.01); *H04N 1/00222* (2013.01); *H04N 1/32459* (2013.01); *G06F 3/1206* (2013.01)

(58) Field of Classification Search
None
See application file for complete search history.

(56) References Cited

U.S. PATENT DOCUMENTS

| | | | | |
|---|---|---|---|---|
| 2003/0215067 A1* | 11/2003 | Ordille | ............. | G06F 17/30864 379/88.13 |
| 2005/0052664 A1* | 3/2005 | Ferlitsch | ............ | H04N 1/00957 358/1.6 |
| 2013/0077112 A1* | 3/2013 | Dodd | .................. | G06K 15/005 358/1.13 |

FOREIGN PATENT DOCUMENTS

| JP | 2009-259292 A | 11/2009 |
|---|---|---|
| JP | 2012-151741 A | 8/2012 |

(Continued)

OTHER PUBLICATIONS https://tools.ietf.org/html/rfc2306.*
(Continued)

*Primary Examiner* — Syed H Hasan
(74) *Attorney, Agent, or Firm* — Scully, Scott, Murphy & Presser, P.C.

(57) ABSTRACT

An information processing device including a communication unit configured to communicate with an external device on an Internet, the external device being configured to generate a single print job based on a single file received from the information processing device and provide the generated print job to a printer, and a controller configured to select one or more first-format files, each of which is in a first format configured such that an individual file in the first format contains a single page, cause a converter to convert the selected one or more first-format files into a single second-format file, the second-format file being in a second format configured to allow an individual file in the second format to contain a plurality of pages, and control the communication unit to transmit the single second-format file acquired through the conversion, to the external device.

17 Claims, 7 Drawing Sheets

(51) Int. Cl.
*H04N 1/00* (2006.01)
*H04N 1/32* (2006.01)

(56) References Cited

FOREIGN PATENT DOCUMENTS

| | | |
|---|---|---|
| JP | 2012-203739 A | 10/2012 |
| WO | WO 02/46905 A1 | 6/2002 |

OTHER PUBLICATIONS

Notification of Reasons for Rejection dated Feb. 21, 2017 received from the Japanese Patent Office in related application JP 2013-244283 together with English language translation.

\* cited by examiner

INFORMATION PROCESSING DEVICE, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2013-244283 filed on Nov. 26, 2013. The entire subject matter of the application is incorporated herein by reference.

BACKGROUND

Technical Field

The following description relates to one or more aspects of an information processing device, and a method and a computer-readable medium therefor.

Related Art

A technique has been known that is adapted to cause a mediation server connected with a network to intermediate between a client and a printer on the network, in order to perform printing with the printer in response to a print instruction from the client.

SUMMARY

There may be a mediation server having specifications configured to process, as a single job, each individual file received from a client. In this case, even though the mediation server receives a plurality of files (such as JPEG-format files) each individually containing a corresponding one of a plurality of pages, a single JPEG-format file corresponding to each individual page is treated as a single job. Therefore, in the case of the mediation server, it is not possible to perform a specific printing operation (such as duplex printing) required to process data containing a plurality of pages as a single job, based on the JPEG-format files respectively corresponding to the plurality of pages.

Aspects of the present disclosure are advantageous to provide one or more improved techniques, for an information processing device, which make it possible to achieve a proper printing operation regardless of a format of files to be printed or specifications of an external device, when the information processing device causes a printer to print the files selected on the information processing device, via the external device on an Internet.

According to aspects of the present disclosure, an information processing device is provided, which includes a communication unit configured to communicate with an external device on an Internet, the external device being configured to generate a single print job based on a single file received from the information processing device and provide the generated print job to a printer, and a controller configured to select one or more first-format files, each of which is in a first format configured such that an individual file in the first format contains a single page, cause a converter to convert the selected one or more first-format files into a single second-format file, the second-format file being in a second format configured to allow an individual file in the second format to contain a plurality of pages, and control the communication unit to transmit the single second-format file acquired through the conversion, to the external device.

According to aspects of the present disclosure, further provided is a method adapted to be implemented on a processor coupled with a communication unit configured to communicate with an external device on an Internet, the external device being configured to generate a single print job based on a single file received from the communication unit and provide the generated print job to a printer, the method including selecting one or more first-format files, each of which is in a first format configured such that an individual file in the first format contains a single page, converting, with a converter, the selected one or more first-format files into a second-format file, the second-format file being in a second format configured to allow an individual file in the second format to contain a plurality of pages, and transmitting, via the communication unit, the single second-format file acquired through the conversion, to the external device.

According to aspects of the present disclosure, further provided is a non-transitory computer-readable medium storing computer-readable instructions that are executable by a processor coupled with a communication unit configured to communicate with an external device on an Internet, the external device being configured to generate a single print job based on a single file received from the information processing device and provide the generated print job to a printer, the instructions being configured to, when executed by the processor, cause the processor to select one or more first-format files, each of which is in a first format configured such that an individual file in the first format contains a single page, cause a converter to convert the selected one or more first-format files into a single second-format file, the second-format file being in a second format configured to allow an individual file in the second format to contain a plurality of pages, and control the communication unit to transmit the single second-format file acquired through the conversion, to the external device.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
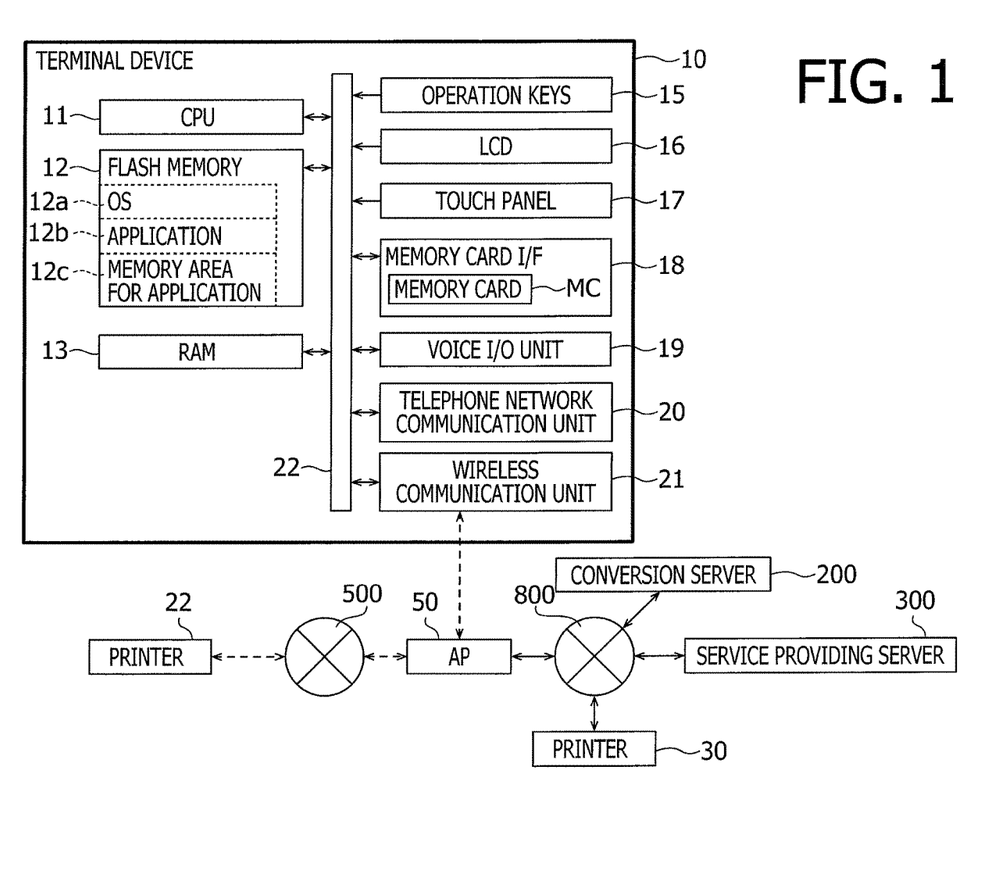
FIG. 1 is a block diagram showing an electrical configuration of a terminal device in a first illustrative embodiment according to one or more aspects of the present disclosure.

Hereinafter, illustrative embodiments according to aspects of the present disclosure will be described with reference to the accompanying drawings. First, referring to FIGS. 1 to 3B, a first illustrative embodiment will be described. FIG. 1 is a block diagram showing an electrical configuration of a terminal device 10 having an application 12b installed thereon.

The terminal device 10 with the application 12b installed thereon is configured to cause a printer 30 on a wireless LAN network 500 to perform printing, and utilize a print service provided by a service providing server 300. The "print service" is a service of the service providing server 300 causing a printer 30 on an Internet 800 to print an image based on a file received from the terminal device 10 by providing the printer 30 with a print job generated based on the file received from the terminal device 10. As an example of the print service, cited is Google Cloud Print™ (a trademark of Google Inc.) provided by Google Inc. By utilizing the print service, the terminal device 10 is allowed to cause the remote printer 30 on the Internet 800 to print the image based on the file to be printed.

Particularly, in the first illustrative embodiment, the terminal device 10 with the application 12b installed thereon is configured to, when utilizing the print service, perform printing of image files (such as JPEG-format files) each of which consists of a single page, based on settings (such as settings for duplex printing) that allow files of a plurality of pages to be processed as a single print job.

The terminal device 10 of the first illustrative embodiment may be a mobile terminal device such as a smartphone. The terminal device 10 includes a central processing unit 11 (hereinafter referred to as a CPU 11), a flash memory 12, a random access memory 13 (hereinafter referred to as a RAM 13), operation keys 15, a liquid crystal display 16 (hereinafter referred to as an LCD 16), a touch panel 17, a memory card interface 18 (hereinafter, which may be referred to as a memory card I/F 18), a voice input/output unit 19, a telephone network communication unit 20, and a wireless communication unit 21. The above elements included in the terminal device 10 are interconnected via a bus line 22.

The CPU 11 is configured to take control of the elements interconnected via the bus line 22, in accordance with parameters (such as fixed values) and programs stored, e.g., in the flash memory 12. The flash memory 12 is a rewritable non-volatile memory. The flash memory 12 stores an operating system 12a and the application 12b. It is noted that hereinafter, an operating system may be referred to as an OS. Further, in the following descriptions, the CPU 11 that is executing a program such as the application 12b or the OS 12a may simply be referred to with a name of the program. For example, "the CPU 11 that is executing the application 12b" may be referred to as "the application 12b." In other words, there may be a case where "the application 12b" represents "the CPU 11 that is executing the application 12b." The OS 12a is basic software configured to achieve standard functions of the terminal device 10. In the first illustrative embodiment, the OS 12a may be an Android OS (Android™ is a trademark or a registered trademark of Google Inc.).

The application 12b is supplied by venders of various devices. The application 12b is installed onto the terminal device 10 by a user. The application 12b allows the user to utilize print functions of the printers 30 from the terminal device 10. More specifically, the application 12b allows the user to utilize, from the terminal device 10, the print function of the printer 30 on the wireless LAN network 500 and the print function of the printer 30 on the Internet using the print service provided by the service providing sever 300. It is noted that each operation in below-mentioned flowcharts shown in FIGS. 2A to 3B is executed by the CPU 11 in accordance with the application 12b.

Further, the flash memory 12 is provided with a memory area 12c for application. The memory area 12c for application is a memory area allocated to the application 12b and to be used by the application 12b. The memory area 12c for application stores various print settings such as a sheet size of printing sheets, an orientation of the sheets in printing, and an Nin1 setting. The Nin1 setting is a setting for allocating files of N pages ("N" is an integer equal to or more than two) on a single page of a sheet. The RAM 13 is a rewritable volatile memory having a temporary area for temporarily storing various types of data when the CPU 11 executes a program such as the application 12b.

The operation keys 15 are mechanical keys for inputting an instruction into the terminal device 10. For instance, the operation keys 15 may be provided at a housing of the terminal device 10. The LCD 16 is configured to display various screen images. The touch panel 17 is placed on top of the LCD 16. The touch panel 17 is configured to input an instruction into the terminal device 10 when an indication body (such as a finger or a stick) is brought into contact with or close to the touch panel 17. The memory card I/F 18 is configured such that a rewritable non-volatile memory card MC is inserted thereinto. Further, the memory card I/F 18 is configured to take control of reading data and files from the memory card MC and writing data and files into the memory card MC. The voice input/output unit 19 includes a microphone and a speaker. The telephone network communication unit 20 is a circuit configured to enable voice communication via a cellular phone network (not shown).

The wireless communication unit 21 is an interface configured to perform wireless communication via a wireless LAN. In the first illustrative embodiment, the wireless communication unit 21 is configured to perform wireless communication via a wireless LAN complying with IEEE 802.11b/g. In the first illustrative embodiment, the wireless communication unit 21 is configured to connect with the wireless LAN network 500 via an access point 50 (hereinafter which may be referred to as an AP 50) as a relay device. Thereby, the terminal device 10 is allowed to perform Wi-Fi wireless communication based on Wi-Fi standards (Wi-Fi® is a trademark registered by Wi-Fi Alliance) with various devices such as the printer 30 on the wireless LAN network 500 via the access point 50.

In addition, the AP 50 has a broadband router function, and is configured to connect with the Internet 800. Thus, the terminal device 10 is allowed to connect with a conversion server 200 and the service providing server 300 on the Internet 800. The conversion server 200 is configured to convert a file in a first format uploaded from the terminal device 10 into image files in a second format. As the second format that is a file format of image files acquired after the conversion, various types of formats such as JPEG, PNG, GIF, and BMP may be employed. In the first illustrative embodiment, the conversion server 200 is configured to convert a PDF-format file (hereinafter which may be referred to as a PDF file) into JPEG-format image files (hereinafter which may be referred to as JPEG files). Further, the conversion server 200 is configured to convert JPEG files into a PDF file. The service providing server 300 is configured to, when accessed by the terminal device 10, provide the terminal device 10 with various services. In the first illustrative embodiment, the service providing server 300 is configured to provide a print service.

Each of the printers 30 is a single-function printer only having a print function. Each printer 30 is configured to print an image based on an image file received from the terminal device 10. The printers 30 available to the terminal device 10 executing the application 12b include the printer 30 configured to receive an image file via the wireless LAN network 500, and the printer 30 configured to receive an image file via the Internet 800, i.e., to receive an image file by utilizing the print service provided by the service providing server 300. Hereinafter, the printer 30 on the wireless LAN network 500 may be referred to as the "Wi-Fi printer 30." Further, the printer 30 on the Internet 800 may be referred to as the "GCP printer 30." One of the printers 30 may concurrently serve as the Wi-Fi printer 30 and the GCP printer 30. It is noted that the GCP printer 30 is previously registered as a print destination of the print service, on the service providing server 30.

Figure 2A:
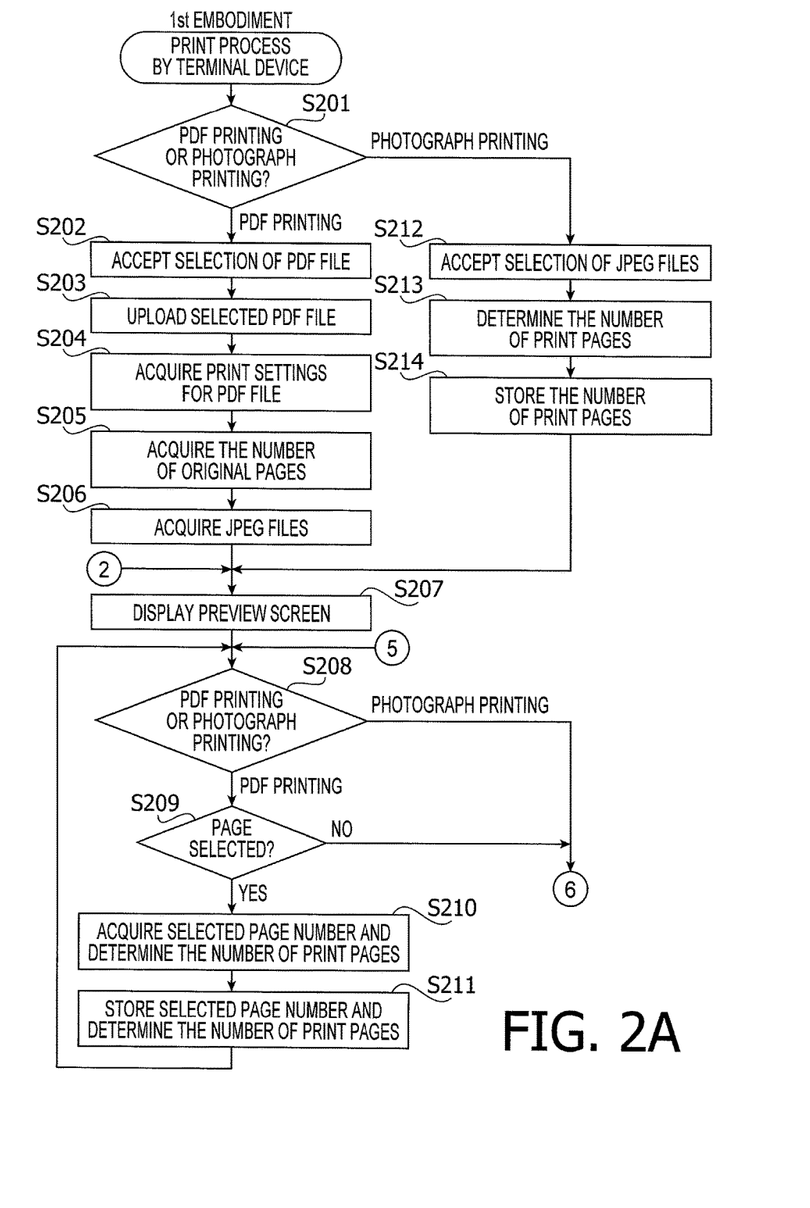
FIGS. 2A, 2B, 3A, and 3B are flowcharts showing a procedure of a print process in the first illustrative embodiment according to one or more aspects of the present disclosure.
Figure 2B:
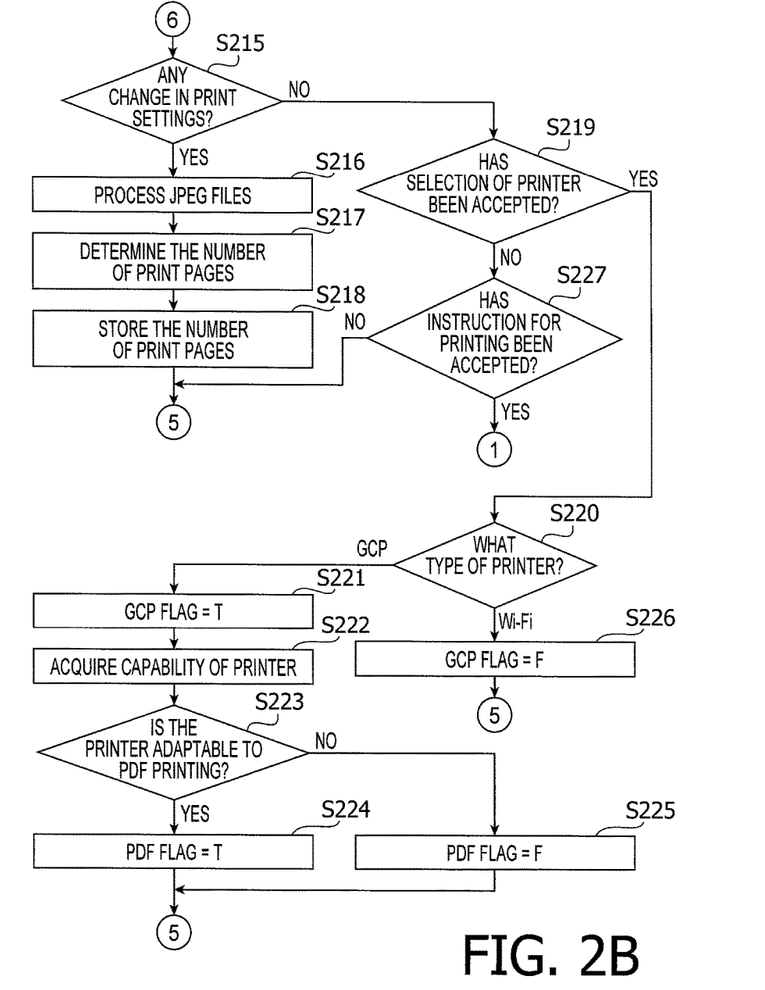

FIGS. 2A and 2B are flowcharts showing a print process to be executed by the CPU 11 of the terminal device 10 in accordance with the application 12b. The print process is started in response to a menu item being selected on a print menu screen (not shown) displayed on the LCD 16 after the application 12b is launched. In the first illustrative embodiment, menu items selectable on the print menu screen include "PDF printing" for printing a PDF file and "photograph printing" for printing a photograph image.

When the print process is started in response to the PDF printing being selected on the print menu screen (S201: PDF printing), the CPU 11 displays on the LCD 16 a file selection screen (not shown) that prompts the user to select a PDF file to be printed. Then, the CPU 11 accepts a selection of a PDF file to be printed, via the file selection screen (S202). The CPU 11 generates thumbnail-size images of PDF files stored in the memory card MC, and displays the generated thumbnail-size images on the file selection screen. The CPU 11 accepts a selection of a thumbnail-size image from among the thumbnail-size images displayed on the file selection screen, as the selection of the PDF file to be printed.

The CPU 11 controls the wireless communication unit 21 to transmit the PDF file selected as a file to be printed, to the AP 50 via Wi-Fi wireless communication, and uploads the selected PDF file onto the conversion server 200 via the Internet 800 (S203). The conversion server 200 analyzes the uploaded PDF file and acquires information (such as print settings and the number of pages constituting the PDF file) included in the PDF file. Hereinafter, the number of pages constituting the PDF file may be referred to as the "number of original pages." Further, the conversion server 200 converts the uploaded PDF file into JPEG files. Each individual one of the JPEG files is generated on the basis of a single page of the pages constituting the PDF file.

The CPU 11 acquires, from the conversion server 200, the print settings and the number of original pages as results of the analysis by the conversion server 200 (S204 and S205). The CPU 11 downloads and acquires the JPEG files generated through the conversion of the PDF file, from the conversion server 200 (S206).

Meanwhile, the print process is started in response to the photograph printing being selected on the print menu screen (S201: photograph printing), the CPU 11 displays on the LCD 16 a photograph selection screen (not shown) that prompts the user to select a photograph image (more specifically, a JPEG file) to be printed, and accepts a selection of one or more JPEG files to be printed, via the photograph selection screen (S212). The CPU 11 generates thumbnail-size images of JPEG files stored as photograph images in the memory card MC, and displays the generated thumbnail-size images on the photograph selection screen. The CPU 11 accepts a selection of one or more thumbnail-size images from among the thumbnail-size images displayed on the photograph selection screen, as the selection of the one or more JPEG files to be printed.

The CPU 11 determines (calculates) the number of printing sheets required for printing the one or more JPEG files to be printed (S213). Hereinafter, the number of printing sheets required for printing the one or more JPEG files to be printed may be referred to as the "number of print pages." The number of print pages is determined in conformity with the number of the JPEG files selected as files to be printed and the print settings stored in the memory area 12c for application. Hereinafter, the print settings stored in the memory area 12c for application may be referred to as the "print settings of the application 12b." The CPU 11 stores the determined number of print pages into the RAM 13 (S214).

After S206 or S214, the CPU 11 displays a preview screen on the LCD 16 (S207). More specifically, when the PDF printing is selected, the CPU 11 generates thumbnail-size images of the JPEG files downloaded from the conversion server 200, and displays the generated thumbnail-size images to be arranged in a predetermined number of rows on every single display screen of the LCD 16. Meanwhile, when the photograph printing is selected, the CPU 11 displays images of the one or more JPEG files selected in S212 on the basis of a single image on every single display screen of the LCD 16. When the PDF printing is selected (S208: PDF printing), the CPU 11 goes to S209. Meanwhile, when the photograph printing is selected (S208: photograph printing), the CPU 11 goes to S215.

After the PDF printing is selected, when the CPU 11 accepts a tapping operation of tapping a thumbnail-size image of a single page, of the thumbnail-size images displayed on the preview screen, a JPEG file corresponding to the tapped thumbnail-sized image is selected as a file to be printed. In S209, when determining that a JPEG file of a single page is selected as a file to be printed (S209: Yes), the CPU 11 acquires a page number, in the PDF file, of the selected JPEG file corresponding to the tapped thumbnail-size image, and determines (calculates) the number of print pages (S210). Hereinafter, the page number, in the PDF file, of the selected JPEG file may be referred to as the "selected page number." The CPU 11 stores the selected page number as acquired and the number of print pages as determined, into the RAM 13 (S211). Then, the CPU 11 goes back to S208.

After the PDF printing is selected, when the CPU 11 accepts not a selection of a JPEG file to be printed but a change in the print settings of the application 12b (S209: No, and S215: Yes), the CPU 11 goes to S216. Further, after the photograph printing is selected, when the CPU 11 accepts a change in the print settings of the application 12b (S208: photograph printing, and S215: Yes), the CPU 11 goes to S216.

In S216, the CPU 11 processes the JPEG files selected as files to be printed, in conformity with the changed print settings of the application 12b. For instance, when an "N" value for the Nin1 setting in the print settings of the application 12b is changed, the CPU 11 processes the JPEG files selected as files to be printed, and generates JPEG files in conformity with the changed Nin1 setting. Thus, when the Nin1 setting or the sheet size is changed, there may be a case where the number of print pages is changed with the change in the Nin1 setting or the sheet size.

The CPU 11 determines (calculates) the number of print pages in conformity with the print settings of the application 12*b* (S217). The CPU 11 stores the determined number of print pages into the RAM 13 (S218). Then, the CPU 11 goes back to S208.

When the CPU 11 accepts not a change in the print settings of the application 12*b* but a selection of a printer 30 to be used for actual printing (S215: No, and S219: Yes), the CPU 11 determines whether the selected printer 30 is the Wi-Fi printer 30 or the GCP printer 30 (S220). It is noted that the selection of the printer 30 to be used for actual printing may be made arbitrarily from a list of printers available to the user or may be made automatically depending on a situation such as a situation where the PDF printing is selected or a situation where the photograph printing is selected.

When determining that the selected printer 30 is the Wi-Fi printer 30 (S220: Wi-Fi), the CPU 11 sets a GCP flag to "F" (S226). Thereafter, the CPU 11 goes back to S208. The GCP flag is a flag indicating whether the printer 30 selected as a printer to be used for actual printing is the GCP printer 30. When the GCP flag is set to "T," the GCP flag indicates that the printer 30 selected as a printer to be used for actual printing is the GCP printer 30. Meanwhile, when the GCP flag is set to "F," the GCP flag indicates that the printer 30 selected as a printer to be used for actual printing is not the GCP printer 30 but the Wi-Fi printer 30.

When determining that the printer 30 selected as a printer to be used for actual printing is the GCP printer 30 (S220: GCP), the CPU 11 sets the GCP flag to "T" (S221). The CPU 11 acquires information on the capability of the selected GCP printer 30 by asking the service providing server 300, on which the GCP printer 30 is registered, about the capability of the selected GCP printer 30 (S222). The CPU 11 determines whether the selected GCP printer 30 is adaptable to PDF printing, based on the acquired information on the capability of the selected GCP printer 30 (S223).

When determining that the selected GCP printer 30 is adaptable to PDF printing (S223: Yes), the CPU 11 sets a PDF flag to "T" (S224). Then, the CPU 11 goes back to S208. Meanwhile, when determining that the selected GCP printer 30 is not adaptable to PDF printing (S223: Yes), the CPU 11 sets the PDF flag to "F" (S225). Then, the CPU 11 goes back to S208.

The PDF flag is a flag indicating whether the GCP printer 30 selected as a printer to be used for actual printing is adaptable to PDF printing. When the PDF flag is set to "T," the PDF flag indicates that the selected GCP printer 30 is adaptable to PDF printing. Meanwhile, when the PDF flag is set to "F," the PDF flag indicates that the selected GCP printer 30 is not adaptable to PDF printing, i.e., the selected GCP printer 30 is not configured to perform PDF printing.

When the CPU 11 accepts not a selection of a printer 30 to be used for actual printing but an instruction to perform printing (more specifically, a tapping operation of tapping a print button displayed on the preview screen (S219: No, and S227: Yes), the CPU 11 goes to S301 (see FIG. 3A). Meanwhile, when the CPU 11 does not accept an instruction to perform printing (S226: No), the CPU 11 goes back to S208.

In S301 (see FIG. 3A), the CPU 11 determines whether the number of print pages is one, or two or more. When determining that the number of print pages is two or more (S301: two or more), the CPU 11 determines whether the printer 30 currently selected as a printer to be used for actual printing is a Wi-Fi printer 30 or a GCP printer 30, based on a setting value for the GCP flag (S302).

Figure 3A:
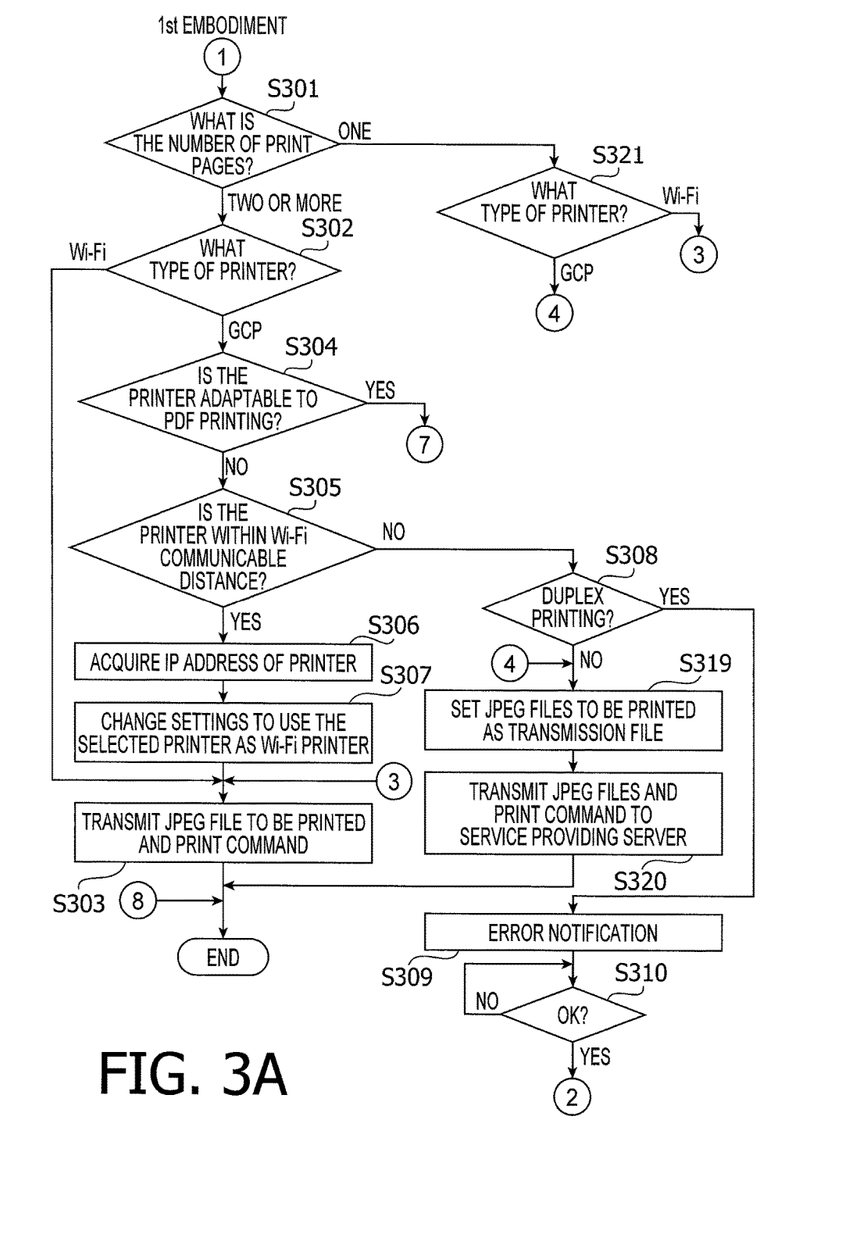

When determining that the currently selected printer 30 is a Wi-Fi printer 30 (S302: Wi-Fi), the CPU 11 controls the wireless communication unit 21 to transmit the JPEG files to be printed and a print command to the selected Wi-Fi printer 30 via Wi-Fi communication through the AP 50 and the wireless LAN network 500 (S303). Then, the CPU 11 terminates the print process. It is noted that the "JPEG files to be printed" handled in S303 and a below-mentioned step S315 are the JPEG files selected in S212 or S210 as files to be printed, or the JPEG files acquired through the processing of the JPEG files in S216.

Meanwhile, when determining that the currently selected printer 30 is a GCP printer 30 (S302: GCP), the CPU 11 determines whether the currently selected GCP printer 30 is adaptable to PDF printing, based on the setting value for the PDF flag (S304). When determining that the currently selected GCP printer 30 is adaptable to PDF printing (S304: Yes), the CPU 11 determines whether PDF printing is selected (S311).

When determining that PDF printing is selected (S311: Yes), the CPU 11 refers to the print settings of the application 12*b* and determines whether a setting "according to printer-side setting values" is valid (S312). The setting "according to printer-side setting values" is a setting for performing printing in accordance with setting values set on the side of a printer 30. The application 12*b* is configured to select one of printing in accordance with the print settings of the application 12*b* independently of the printer-side setting values and printing in accordance with the printer-side print settings.

When determining that the setting "according to printer-side setting values" is not set (S312: No), the CPU 11 determines whether a setting value for the sheet size in the print settings of the application 12*b* is equal to a setting value for the sheet size in the print settings for the PDF file that have been acquired in S204 (S313). When determining that the setting value for the sheet size in the print settings of the application 12*b* is not equal to the setting value for the sheet size of the print settings acquired in S204 (S313: No), the CPU 11 determines whether there has been a change in the print settings of the application 12*b* or the number of pages (S314). It is noted that, in S314, when the number of original pages is different from the number of print pages, the CPU 11 determines that there has been a change in the number of pages.

Figure 3B:
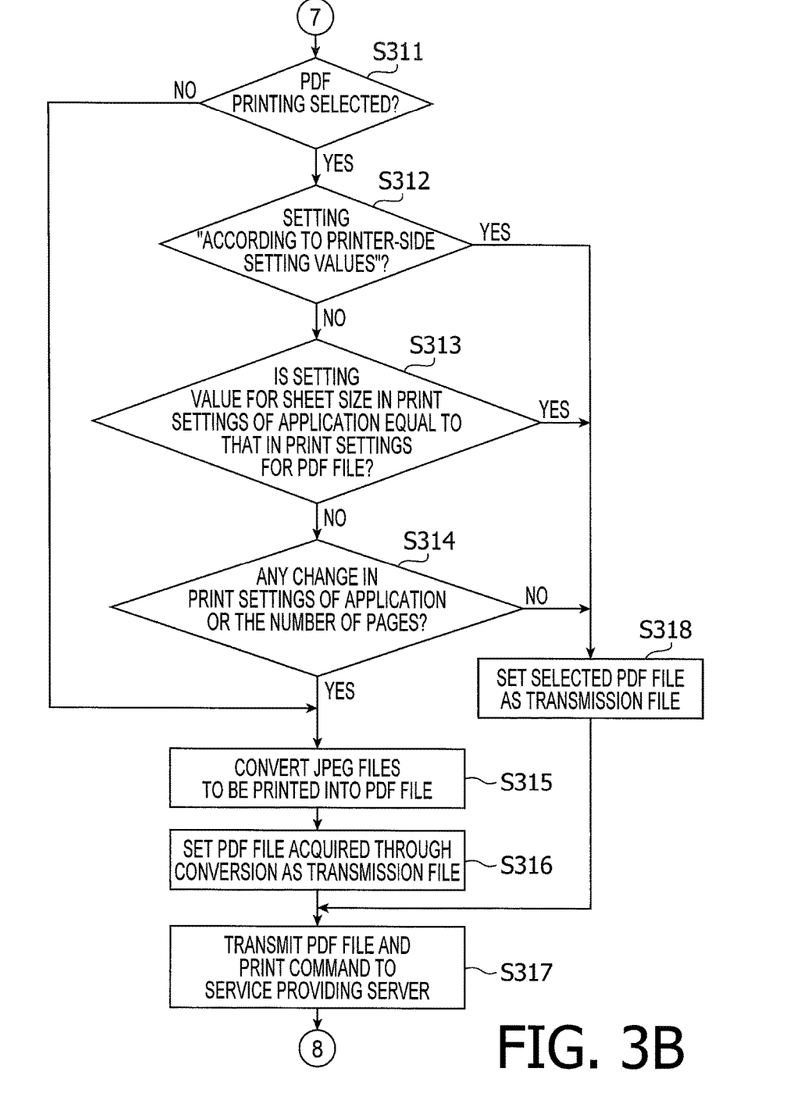

When determining that there has been a change in the print settings of the application 12*b* or the number of pages (S314: Yes), the CPU 11 converts the JPEG files to be printed, into a PDF file (S315). Specifically, the CPU 11 uploads, via the wireless communication unit 21, the JPEG files to be printed onto the conversion server 200, and causes the conversion server 200 to convert the JPEG files into a PDF file. Then, the CPU 11 downloads and acquires the PDF file generated through the conversion, from the conversion server 200. The CPU 11 sets the PDF file acquired through the conversion of the JPEG files, as a transmission file to be transmitted to the service providing server 300 (S316).

The CPU 11 controls the wireless communication unit 21 to transmit the set transmission file and a print command to the service providing server 300 via the Internet 800 (S317). Thereafter, the CPU 11 terminates the print process. The print command contains the print settings of the application 12*b* and information on the currently selected GCP printer 30. The service providing server 300 generates a print job based on the PDF file and the print command received from the terminal device 10. Then, the service providing server 300 transmits the generated print job to the GCP printer 30 as a print destination, i.e., the GCP printer 30 currently selected by the application 12*b*. Consequently, images based on the PDF file set as a transmission file are printed in accordance with the print settings of the application 12*b* by the currently selected GCP printer 30. It is noted that, when the print settings of the application 12*b* include the setting "according to printer-side setting values," images based on the PDF file are printed in accordance with the printer-side setting values, in compliance with the print settings of the application 12*b*.

Meanwhile, when determining that what is selected is not PDF printing but photograph printing (S311: No), the CPU 11 goes to S315. Thus, in the case of photograph printing as well, the JPEG files to be printed are converted into a PDF file, and the PDF file is transmitted to the service providing server 300.

According to the aforementioned steps S315 to S317, a plurality of JPEG files to be printed are transmitted to the service providing server 300, as a PDF file including a plurality of pages that correspond to the plurality of JPEG files, respectively. Therefore, it is possible to cause the GCP printer 30 to print the plurality of JPEG files selected, in a single print job. Thus, even though the print settings of the application 12*b* include a setting (e.g., duplex printing) required to treat a plurality of JPEG files in a single job, it is possible to perform printing in accordance with the setting.

Meanwhile, when determining that the setting "according to printer-side setting values" is valid (S312: Yes), the CPU 11 sets, as a transmission file, the PDF file selected as a file to be printed, i.e., the PDF file selected in S202 (S318). Namely, in this case, the JPEG files are not converted into a PDF file. When the setting "according to printer-side setting values" is valid, the processing of the JPEG files in S216 is meaningless. Thus, it is required to transmit the PDF file, currently selected as a file to be printed, as it is to the service providing server 300, but it is not required to convert the JPEG files into a PDF file. Therefore, in this case, by setting, as a transmission file, the PDF file selected as a file to be printed, it is possible to omit the conversion of the JPEG files into a PDF file and to start a printing operation earlier accordingly.

When determining that a setting value for the sheet size in the print settings of the application 12*b* is equal to a setting value for the sheet size in the print settings for the PDF file that have been acquired in S204 (S313: Yes), or when determining that there has not been any change in the print settings of the application 12*b* or the number of pages (S314: No), the CPU 11 goes to S318. Namely, in this case, the JPEG files are not converted into a PDF file. When a setting value for the sheet size in the print settings of the application 12*b* is equal to a setting value for the sheet size in the print settings for the PDF file, or when there has not been any change in the print settings of the application 12*b* or the number of pages, even though the JPEG files to be printed are converted into a PDF file, the resulting PDF file is the same as the original PDF file selected as a file to be printed. Thus, in this case, by setting, as a transmission file, the PDF file selected as a file to be printed, it is possible to omit the conversion of the JPEG files into a PDF file and to start a printing operation earlier accordingly.

When executing S318 as a result of the determinations in S312 to S314, the CPU 11 incorporates, in the print settings of the application 12*b*, the selected page number stored in the RAM 13. Thereby, the service providing server 300 receives the selected page number as a part of the print settings of the application 12*b*, along with the PDF file set as a transmission file. The service providing server 300 identifies, as a page to be printed, a page corresponding to the selected page number, of the pages constituting the received PDF file. Consequently, an image based on the page selected in S209 of the pages constituting the PDF file selected as a file to be printed is printed by the GCP printer 30.

In S304, when determining that the currently selected GCP printer 30 is not adaptable to PDF printing (S304: No), the CPU 11 determines whether the currently selected GCP printer 30 is within a communicable distance for Wi-Fi communication with the terminal device 10, i.e., whether the currently selected GCP printer 30 is on the wireless LAN network 500 (S305).

The CPU 11 makes the determination in S305, e.g., using broadcast retrieval in the wireless LAN network 500. Specifically, the CPU 11 searches and finds one or more printers 30 existing on the wireless LAN network 500 in a broadcast retrieval method, and acquires specific information (such as a MAC address) of each printer 30 on the wireless LAN network 500. The CPU 11 compares the specific information acquired by the broadcast retrieval with specific information of the currently selected GCP printer 30 that has been acquired from the memory area 12*c* for application. Then, when determining as a result of the comparison that there is, on the wireless LAN network 500, a printer 30 having the same specific information as the specific information of the GCP printer 30, the CPU 11 determines that the currently selected GCP printer 30 is within the communicable distance for Wi-Fi communication with the terminal device 10.

When determining that the currently selected GCP printer 30 is within the communicable distance for Wi-Fi communication with the terminal device 10 (S305: Yes), the CPU 11 acquires an IP address of the currently selected GCP printer 30 from the service providing server 300 (S306). The CPU 11 changes one or more settings to use the currently selected GCP printer 30 as a Wi-Fi printer (S307). Specifically, with the IP address acquired in S306, the CPU 11 establishes Wi-Fi communication via the AP 50, between the wireless communication unit 21 and the printer 30 originally selected as a GCP printer.

The CPU 11 controls the wireless communication unit 21 to transmit the JPEG files to be printed and a print command to the printer 30 originally selected as a GCP printer (i.e., the printer 30 having the IP address acquired in S306), via Wi-Fi communication through the AP 50 and the wireless LAN network 500 (S303). Thereafter, the CPU 11 terminates the print process.

According to the aforementioned steps S305 to S307, when a printer 30 that is not adaptable to PDF printing is selected as a GCP printer 30, and the GCP printer 30 is within the communicable distance for Wi-Fi communication with the terminal device 10, the printer 30 selected as the GCP printer 30 is utilized as a Wi-Fi printer to perform printing based on JPEG files to be printed. Therefore, it is possible to prevent a file in a format to which the printer 30 is not adaptable from being transmitted to the printer 30. Further, in this case, it is possible to omit the conversion of the JPEG files into a PDF file and to start a printing operation earlier accordingly. Moreover, the Wi-Fi printer treats, as a single job, the plurality of JPEG files transmitted by the terminal device 10 in S303. Thus, the Wi-Fi printer is adaptable to a specific printing operation (such as duplex printing) to which the GCP printer is not adaptable.

In S305, when determining that the currently selected GCP printer 30 is not within the communicable distance for Wi-Fi communication with the terminal device 10 (S305: No), the CPU 11 determines whether a specific setting (e.g., duplex printing) required to process a plurality of JPEG files as a single job is valid in the print settings of the application 12b (S308). When determining that a specific setting for required to process a plurality of JPEG files as a single job is valid in the print settings of the application 12b (S308: Yes), the CPU 11 displays an error notification on the LCD 16 (S309). After displaying the error notification, the CPU 11 waits to accept an operation of acknowledging the error notification (S310: No). When accepting an operation of acknowledging the error notification (S310: Yes), the CPU 11 goes back to S207 (see FIG. 2A).

Meanwhile, in S308, when determining that a specific setting required to process a plurality of JPEG files as a single job is not set in the print settings of the application 12b (S308: No), the CPU 11 sets the JPEG files to be printed, as transmission files (S319). The CPU 11 controls the wireless communication unit 21 to transmit the set transmission file and a print command to the service providing server 300 via the Internet 800 (S320). Thereafter, the CPU 11 terminates the print process. The service providing server 300 generates print jobs based on the received JPEG files and the received print command, and then transmits the generated print jobs to the GCP printer 30 as a print destination. The service providing server 300 generates a print job based on every single JPEG file. Therefore, the print jobs as many as the received JPEG files are generated and transmitted to the GCP printer 30.

According to the aforementioned steps S308 to S310, S319, and S320, when the currently selected GCP printer 30 is not adaptable to PDF printing or present within the communicable distance for Wi-Fi communication with the terminal device 10, the GCP printer 30 is caused to perform printing based on the JPEG files to be printed, provided that a specific setting (e.g., duplex printing) required to process a plurality of JPEG files as a single print job is not set. Therefore, it is possible to avoid an undesired print result that is different from an originally intended print result according to a specific setting required to process a plurality of JPEG files as a single print job. Further, when a specific setting required to process a plurality of JPEG files as a single print job is not set, it is possible to perform an intended printing operation according to the print settings of the application 12b, even based on the JPEG files as they are, without being converted into a PDF file. Thus, it is possible to perform an intended printing operation without having to change the currently selected printer 30 to another one.

Meanwhile, in S301, when determining that the number of print pages is one (S301: one), the CPU 11 determines whether the printer 30 currently selected as a printer to be used for actual printing is a Wi-Fi printer 30 or a GCP printer 30, in the same manner as S302 (S321). When determining that the currently selected printer 30 is a Wi-Fi printer 30 (S321: Wi-Fi), the CPU 11 goes to S303. When determining that the currently selected printer 30 is a GCP printer 30 (S321: GCP), the CPU 11 goes to S319.

Therefore, when the number of JPEG files to be printed is one, even though the GCP printer 30 is selected, the JPEG file is transmitted to the service providing server 300. The service providing server 300 treats a single JPEG file as a single print job. Thus, regardless of the print settings, it is possible to perform an intended printing operation without having to converting the JPEG file into a PDF file.

According to the first illustrative embodiment, when PDF printing or photograph printing is performed with a GCP printer 30, and the number of JPEG files to be printed is two or more, a PDF file into which the plurality of JPEG files have been converted is transmitted to the service providing server 300. Therefore, it is possible to cause the service providing server 300 to treat the plurality of JPEG files as a single print job. Thereby, it is possible to properly perform printing according to various print settings including duplex printing, with the GCP printer 30.

Meanwhile, when it is not required to covert JPEG files into a PDF file (e.g., in the case of PDF printing or the case where the print settings of the application 12b include the setting "according to printer-side setting values"), the PDF file selected as a file to be printed is transmitted to the service providing server 300. Therefore, it is possible to omit the conversion of the JPEG files into a PDF file and to start a printing operation earlier accordingly.

Further, the conversion of JPEG files into a PDF file is executed, provided that the number of print pages (i.e., the number of the JPEG files selected as files to be printed or the JPEG files acquired as a result of the processing in S216) is two or more. In other words, when the number of print pages is one, the conversion is omitted. When the number of print pages is one, even though the single JPEG file is transmitted to the service providing server 300, the single JPEG file is treated as a single print job. Hence, it is meaningless to convert the single JPEG file into a PDF file. Thus, when the number of print pages is one, i.e., when the number of JPEG files to be printed is one, it is possible to omit the conversion of the single JPEG file into a PDF file and to start a printing operation earlier accordingly.

Particularly, when the number of JPEG files selected as files to be printed is two or more, but the number of print pages becomes one as a result of the processing in S216 in response to a change in the print settings of the application 12b (such as a change in the Nin1 setting or a change in the sheet size), the conversion of the JPEG files into a PDF file is omitted. Thus, even though the number of JPEG files selected as files to be printed is two or more, it is possible to shorten a time period required for printing as needed responsive to a change in the print settings of the application 12b.

According to the first illustrative embodiment, the conversion of the JPEG files into a PDF file is executed, provided that the GCP printer 30 is selected. Namely, when the Wi-Fi printer 30 is selected, even though there are two or more JPEG files to be printed, the JPEG files are printed without being converted into a PDF file. Thus, responsive to the omission of the file conversion, it is possible to start a printing operation earlier accordingly.

Figure 4A:
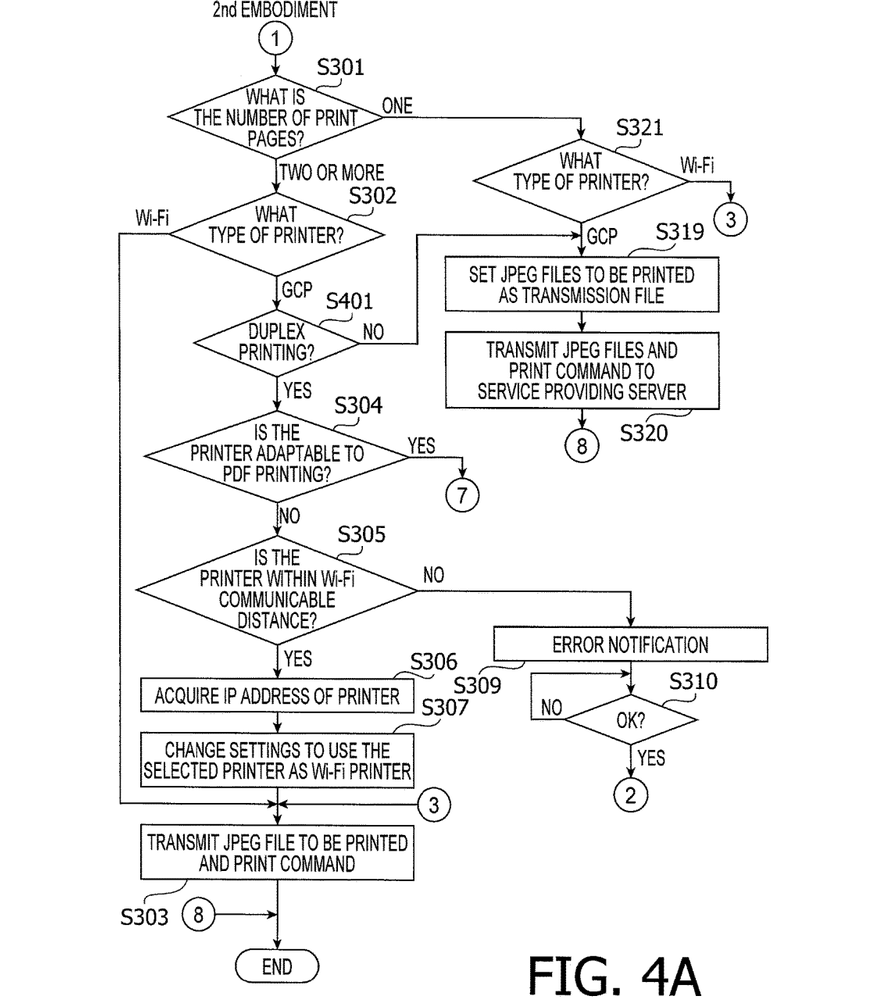
FIGS. 4A and 4B are a flowchart showing a partial procedure of a print process in a second illustrative embodiment according to one or more aspects of the present disclosure.
Figure 4B:
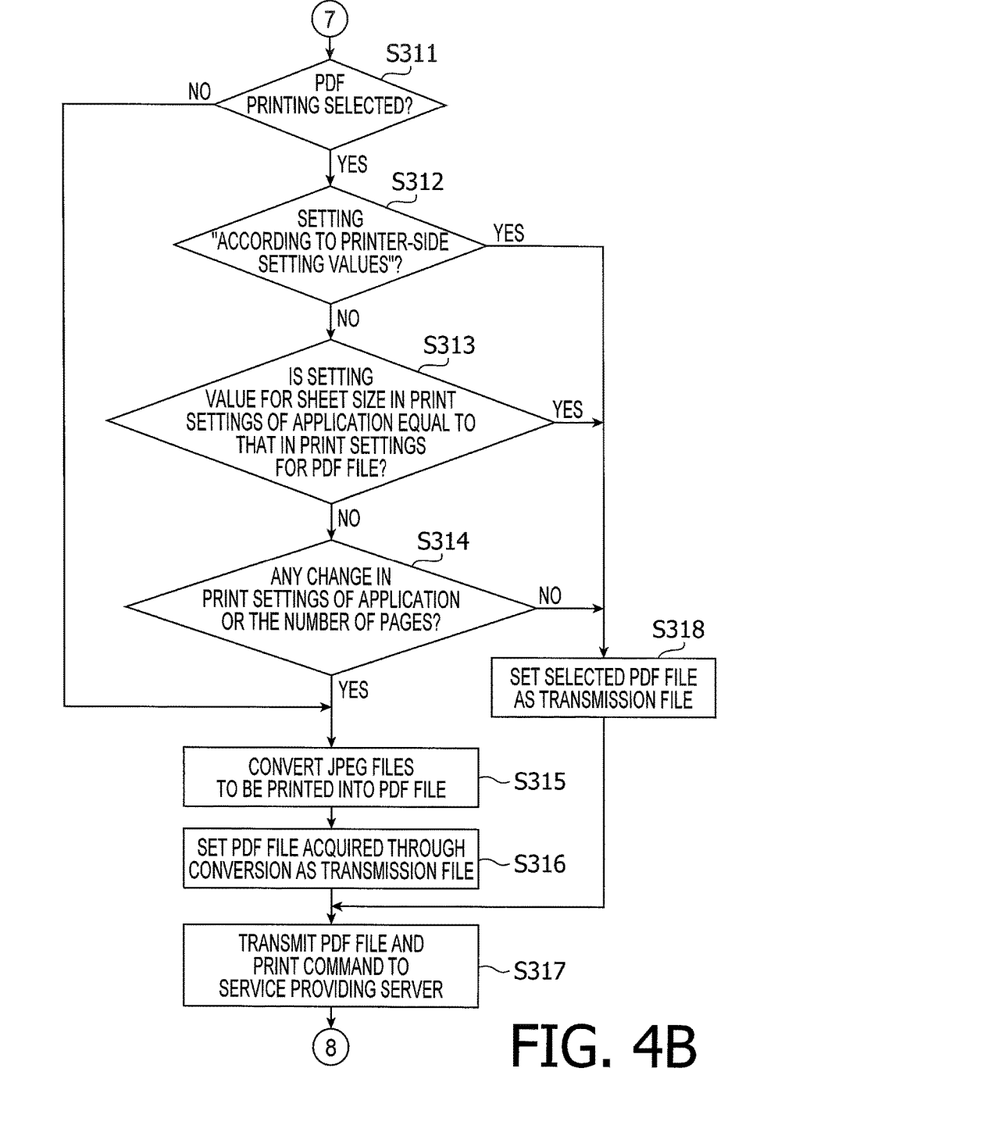

Subsequently, referring to FIGS. 4A and 4B, an explanation will be provided about a second illustrative embodiment according to aspects of the present disclosure. In the second illustrative embodiment, the same elements as described in the first illustrative embodiment will be provided with the same reference characters, and detailed explanations thereof will be omitted. FIGS. 4A and 4B are flowcharts showing a print process in the second illustrative embodiment. Each operation (step) shown in the flowcharts of FIGS. 4A and 4B is an operation to be executed by the CPU 11 in accordance with an application 12b. Hereinafter, features different from the first illustrative embodiment will mainly be described.

In the aforementioned first illustrative embodiment, when the currently selected printer 30 is a GCP printer 30 adaptable to PDF printing, a plurality of JPEG files are converted into a PDF file, and the PDF file is printed. In the second illustrative embodiment, even when the number of print pages is two or more, a plurality of JPEG files are converted into a PDF file, provided that a specific setting (e.g., duplex printing) required to process the plurality of JPEG files as a single print job is valid.

Specifically, in S302, when determining that the currently selected printer 30 is a GCP printer 30 (S302: GCP), the CPU 11 determines whether a specific setting (e.g., duplex printing) required to process a plurality of JPEG files as a single print job is valid in the print settings of the application 12b (S401). When the CPU 11 determines that a specific setting required to process a plurality of JPEG files as a single print job is not set in the print settings of the application 12b (S401: No), the CPU 11 goes to S319. Meanwhile, when the CPU 11 determines that a specific setting required to process a plurality of JPEG files as a single print job is valid in the print settings of the application 12b (S401: Yes), the CPU 11 goes to S304. It is noted that, when determining that the currently selected GCP printer 30 is not within the communicable distance for Wi-Fi communication with the terminal device 10 (S305: No), the CPU 11 goes to S309. Namely, in the second illustrative embodiment, the operation in S308 is omitted.

According to the second illustrative embodiment, when PDF printing or photograph printing is performed with a GCP printer 30, and the number of JPEG files to be printed is two or more, the plurality of JPEG files are converted into a PDF file, provided that a specific setting (e.g., duplex printing) required to process the plurality of JPEG files as a single print job is valid. Namely, when a specific setting (such as duplex printing) required to process the plurality of JPEG files as a single print job is not set, i.e., when each individual one of the JPEG files may be treated as a single print job, it is possible to print the JPEG files as they are, without having to convert the JPEG files into a PDF file. Therefore, even though a printing operation is performed with a GCP printer 30, when it is not required to treat a plurality of JPEG files as a single print job, it is possible to omit the conversion of the JPEG files into a PDF file and to start a printing operation earlier accordingly.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

Modification

In the aforementioned illustrative embodiments, the terminal device 10 has the application 12b installed thereon. Nevertheless, the application 12b may be installed on another information processing device such as a personal computer, a tablet terminal device, a digital camera, and a music reproduction device. Further, in the aforementioned illustrative embodiments, the Android OS is exemplified as the OS 12a installed on the terminal device 10. Nevertheless, another OS may be installed on the terminal device 10.

In the aforementioned illustrative embodiments, a printer only having a print function is illustrated as an example of each printer 30. Nevertheless, a multi-function peripheral having one or more other functions as well as a print function may be employed instead. Further, in the aforementioned illustrative embodiments, the Wi-Fi printer 30 configured to receive an image file via the wireless LAN network 500 is exemplified. Nevertheless, a printer on a wired LAN network may be employed instead.

In the aforementioned illustrative embodiments, the conversion server 200 is configured to execute file-format conversion between a PDF file and JPEG files. Nevertheless, the terminal device 10 may be configured to execute file conversion between a PDF file and JPEG files.

In the aforementioned illustrative embodiments, the conversion server 200 is a server specifically for executing file-format conversion. Nevertheless, the conversion server 200 may have one or more other functions as well as the file-format converting function. For example, the conversion server 200 may be configured to execute file-format conversion and generate print data based on a file acquired through the conversion.

In the aforementioned illustrative embodiments, the conversion server 200 is configured to convert a PDF file into JPEG files and convert JPEG files into a PDF file. Nevertheless, there may be provided a server configured to convert a PDF file into JPEG files, and another server configured to convert JPEG files into a PDF file. In this case, at least one of the servers may have one or more other functions as well as the file-format converting function.

In the aforementioned illustrative embodiments, a PDF file is exemplified as a file, which is selectable as a file to be printed, in a format configured to contain one or more pages in every single file. Nevertheless, files in various types of formats may be employed instead such as a DOC-format document file generated by a Microsoft Word® (trademark registered by the Microsoft Corporation). Further, an Excel file generated by a Microsoft Excel® (trademark registered by the Microsoft Corporation) may be employed.

In the aforementioned illustrative embodiments, duplex printing is exemplified as a specific setting required to process a plurality of JPEG files as a single print job. However, such a specific setting is not limited to duplex printing, and may include a setting for "secure printing" required to perform password authentication in every single print job and a setting for re-printing a file to be printed.

In the aforementioned illustrative embodiments, in S312, the CPU 11 determines whether the setting "according to printer-side setting values" is valid in the print settings of the application 12b. Instead, however, the CPU 11 may determine whether a setting for printing according to the print settings for the PDF file that have been acquired in S204 is valid. In this modification, when determining that a setting for printing according to the print settings for the PDF file that have been acquired in S204 is valid, the CPU 11 may go to S318. Meanwhile, when determining that a setting for printing according to the print settings for the PDF file that have been acquired in S204 is not set, the CPU 11 may proceed in the same manner as when making a negative determination in S312 (S312: No) in the aforementioned illustrative embodiments, and consequently, may go to S315.

In the aforementioned illustrative embodiments, the conversion of JPEG files into a PDF file is executed, provided that the number of print pages is two or more. Nevertheless, even though the number of print pages is one, the conversion of a JPEG file into a PDF file may be executed. In this case, the determination as to the number of print pages is unnecessary.

The above descriptions have been provided based on such a configuration that the CPU 11 performs each operation shown in FIGS. 2A to 4B. Nevertheless, a plurality of CPUs may perform each operation shown in FIGS. 2A to 4B in cooperation with each other. Further, one or more circuits such as application specific integrated circuits (hereinafter referred to as ASICs) may perform each operation shown in FIGS. 2A to 4B, solely or in cooperation with each other. Furthermore, the CPU 11 and one or more circuits such as ASICs may perform each operation shown in FIGS. 2A to 4B in cooperation with each other.

A part of the operations shown in FIGS. 2A to 4B may be omitted or changed within the scope of the technical concept as expressed in the present disclosure. For instance, the operations in S312 to S314 may be omitted. Further, the operation in S305 may be omitted. In this case, when making a negative determination in S304 (S304: No), the CPU 11 may go to S308 or S309.

What is claimed is:

1. An information processing device comprising:
   a communication unit configured to communicate with an external device on an Internet, the external device being configured to generate a single print job based on a single file received from the information processing device and provide the generated print job to a printer; and
   a controller configured to:
      select one or more first-format files, each of which is in a first format configured such that an individual file in the first format contains image data of an image;
      determine whether one first-format file is selected, or a plurality of first-format files is selected;
      when it is determined that one first-format file is selected, control the communication unit to transmit the one first-format file to the external device; and
      when it is determined that a plurality of first-format files is selected, cause a converter to convert the selected plurality of first-format files into a single second-format file in a second format, the second-format file containing the image data contained in each of the plurality of first-format files and control the communication unit to transmit the single second-format file acquired through the converter, to the external device.

2. A method adapted to be implemented on a processor coupled with a communication unit configured to communicate with an external device on an Internet, the external device being configured to generate a single print job based on a single file received from the communication unit and provide the generated print job to a printer, the method comprising:
   selecting one or more first-format files, each of which is in a first format configured such that an individual file in the first format contains image data of an image;
   determining whether one first-format file is selected, or a plurality of first-format files is selected;
   when it is determined that one first-format file is selected, controlling the communication unit to transmit the one first-format file to the external device, and
   when it is determined that a plurality of first-format files is selected,
      converting, with a converter, the selected plurality of first-format files into a single second-format file in a second format, the second-format file containing the image data contained in each of the plurality of first-format files and transmitting, via the communication unit, the single second-format file acquired through the converter, to the external device.

3. A non-transitory computer-readable medium storing computer-readable instructions that are executable by a processor coupled with a communication unit configured to communicate with an external device on an Internet, the external device being configured to generate a single print job based on a single file received from the processor and provide the generated print job to a printer, the instructions being configured to, when executed by the processor, cause the processor to:
   select one or more first-format files, each of which is in a first format configured such that an individual file in the first format contains image data of an image;
   determine whether one first-format file is selected, or a plurality of first-format files is selected;
   when it is determined that one first-format file is selected, control the communication unit to transmit the selected one first-format file to the external device;
   when it is determined that a plurality of first-format files is selected:
      determine whether a condition for conversion is satisfied;
      when it is determined that the condition for conversion is satisfied:
         cause a converter to convert the selected plurality of first-format files into a single second-format file in a second format, the second-format file containing the image data contained in each of the plurality of first-format files; and
         control the communication unit to transmit the single second-format file acquired through the converter; and
      when it is determined that the condition for conversion is not satisfied:
         not cause the converter to convert the selected plurality of first-format files into the single second-format file; and
         control the communication unit to transmit the selected plurality of first-format files to the external device.

4. The non-transitory computer-readable medium according to claim 3,
   wherein the processor is coupled with a storage storing first print settings and the condition for conversion is a setting to treat the plurality of first-format files as a single print job, and
   wherein the instructions are configured to, when executed by the processor, cause the processor to cause the converter to convert the selected plurality of first-format files into the single second-format file when a setting required to treat the plurality of first-format files as a single print job is set in the first print settings.

5. The non-transitory computer-readable medium according to claim 3,
   wherein the instructions are configured to, when executed by the processor, cause the processor to:
      when accepting a change in a print setting, generate a plurality of first-format files by processing the selected plurality of first-format files in conformity with the accepted change in the print setting; and control the communication unit to transmit the single second-format file acquired through the conversion of the generated plurality of first-format files, to the external device.

6. The non-transitory computer-readable medium according to claim 5,
wherein the accepted change in the print setting is a change in an Nin1 setting for allocating first-format files of "N" pages on a single page of a sheet, the "N" representing an integer equal to or more than two, and
wherein the instructions are configured to, when executed by the processor, cause the processor to, when the number of the plurality of first-format files generated by processing the selected plurality of first-format files in conformity with the accepted change in the Nin1 setting is one, control the communication unit to transmit one of the plurality first-format files generated, to the external device.

7. The non-transitory computer-readable medium according to claim 3,
wherein the instructions are configured to, when executed by the processor, cause the processor to:
control the communication unit to transmit the selected plurality of first-format files to a second external device comprising the converter; and
control the communication unit to receive the single second-format file from the converter.

8. The non-transitory computer-readable medium according to claim 3,
wherein the processor is coupled with a storage, and
wherein the instructions are configured to, when executed by the processor, cause the processor to:
cause a second converter to convert a file stored in the storage into a second plurality of first-format files that correspond to image data for images contained in the file stored in the storage, respectively;
select at least two first-format files from among the second plurality of first-format files acquired through the conversion of the file stored in the storage;
cause the converter to convert the selected at least two first-format file into the single second-format file.

9. The non-transitory computer-readable medium according to claim 8,
wherein the instructions are configured to, when executed by the processor, cause the processor to:
control the communication unit to transmit the file stored in the storage to a second external device comprising the second converter; and
control the communication unit to receive, from the second converter, the second plurality of first-format files that correspond to the image data for respective images contained in the file stored in the storage, respectively.

10. The non-transitory computer-readable medium according to claim 8,
wherein the file stored in the storage is in a specific format configured to allow an individual file in the specific format to contain a plurality of pages, and
wherein the instructions are configured to, when executed by the processor, cause the processor to:
when accepting a change in a print setting, cause the converter to convert the selected at least two first-format file into the single second-format file, and control the communication unit to transmit the single second-format file acquired through the conversion of the selected at least two first-format files, to the external device; and
in response to accepting a print instruction without accepting a change in a print setting, control the communication unit to transmit the file stored in the storage, to the external device.

11. The non-transitory computer-readable medium according to claim 8,
wherein the instructions are configured to, when executed by the processor, cause the processor to:
when a number of the at least two first-format files selected from among the second plurality of first-format files acquired through the conversion of the file stored in the storage is not equal to a number of the second plurality of first-format files acquired through the conversion of the file stored in the storage, cause the converter to convert the selected at least two first-format file into the single second-format file, and control the communication unit to transmit the single second-format file acquired through the conversion of the selected at least two first-format files, to the external device; and
when the number of the at least two first-format files selected from among the second plurality of first-format files acquired through the conversion of the file stored in the storage is equal to the number of the second plurality of first-format files acquired through the conversion of the file stored in the storage, control the communication unit to transmit the file stored in the storage to the external device.

12. The non-transitory computer-readable medium according to claim 8,
wherein the storage stores first print settings,
wherein the file stored in the storage is in a specific format configured to allow an individual file in the specific format to contain a plurality of pages, and
wherein the instructions are configured to, when executed by the processor, cause the processor to,
when a setting for performing printing in accordance with the first print settings is set, cause the converter to convert the selected at least two first-format files into the single second-format file, and control the communication unit to transmit the single second-format file acquired through the conversion of the selected at least two first-format files, to the external device; and
when a setting for performing printing in accordance with print settings different from the first print settings and configured independently of the instructions is set, control the communication unit to transmit the file stored in the storage to the external device.

13. The non-transitory computer-readable medium according to claim 8,
wherein the storage stores first print settings,
wherein the file stored in the storage is in a specific format configured to allow an individual file in the specific format to contain a plurality of pages, and
wherein the instructions are configured to, when executed by the processor, cause the processor to,
determine whether a sheet size designated in the first print settings is equal to a sheet size designated in second print settings contained in the file stored in the storage;
when determining that the sheet size designated in the first print settings is not equal to the sheet size designated in second print settings contained in the file stored in the storage, cause the converter to convert the selected at least two first-format files into the single second-format file, and control the communication unit to transmit the single second-format file acquired through the conversion of the selected at least two first-format files, to the external device; and when determining that the sheet size designated in the first print settings is equal to the sheet size designated in second print settings contained in the file stored in the storage, control the communication unit to transmit the file stored in the storage to the external device.

14. The non-transitory computer-readable medium according to claim 3, wherein the instructions are configured to, when executed by the processor, cause the processor to:

determine whether the printer configured to receive the print job from the external device is adaptable to the second-format file;

when determining that the printer is adaptable to the second-format file, cause the converter to convert the selected plurality of first-format files into the single second-format file, and control the communication unit to transmit the single second-format file acquired through the conversion of the selected plurality of first-format files, to the external device; and when determining that the printer is not adaptable to the second-format file, control the communication unit to transmit the selected plurality of first-format files to the external device.

15. The non-transitory computer-readable medium according to claim 14, wherein the communication unit is configured to communicate with one or more LAN printers on a local area network, and wherein the instructions are configured to, when executed by the processor, cause the processor to:

when determining that the printer configured to receive the print job from the external device is not adaptable to the second-format file, determine whether the printer is connected with the local area network; and when determining that the printer is not adaptable to the second-format file and that the printer is connected with the local area network, control the communication unit to transmit the selected plurality of first-format files to the printer via the local area network.

16. The non-transitory computer-readable medium according to claim 15, wherein the processor is coupled with a storage storing first print settings, and wherein the instructions are configured to, when executed by the processor, cause the processor to:

when determining that the printer configured to receive the print job from the external device is not adaptable to the second-format file, that the printer is not connected with the local area network, and that a setting required to treat the selected plurality of first-format files as a single print job is set in the first print settings, perform a predetermined error operation; and when determining that the printer configured to receive the print job from the external device is not adaptable to the second-format file, that the printer is not connected with the local area network, and that the setting required to treat the selected plurality of first-format files as a single print job is not set in the first print settings, control the communication unit to transmit the selected plurality of first-format files to the external device.

17. The non-transitory computer-readable medium according to claim 3, wherein the communication unit is configured to communicate with a LAN printer on a local area network, and wherein the instructions are configured to, when executed by the processor, cause the processor to:

select one of the printer configured to receive the print job from the external device and the LAN printer on the local area network, wherein the condition for conversion is a selected printer;

when the LAN printer on the local area network is selected, control the communication unit to transmit the selected plurality of first-format files to the LAN printer via the local area network, without causing the converter to convert the selected one or more first-format files; and when the printer configured to receive the print job from the external device is selected, cause the converter to convert the selected plurality of first-format files into the single second-format file.

* * * * *